United States Patent [19]

Ford

[11] 3,827,777
[45] Aug. 6, 1974

[54] MICROSCOPE FIELD MARKER

[76] Inventor: Ethelyn Ford, 8 Capri Ln., Pleasant Hill, Calif. 94530

[22] Filed: June 14, 1973

[21] Appl. No.: 370,020

Related U.S. Application Data

[63] Continuation of Ser. No. 172,064, Aug. 16, 1971, abandoned.

[52] U.S. Cl. .................................. 350/81, 350/94
[51] Int. Cl. ........................................... G02b 21/00
[58] Field of Search ......................... 350/81, 92, 94

[56] References Cited
UNITED STATES PATENTS

| | | | |
|---|---|---|---|
| 2,508,413 | 5/1950 | Massinger | 350/92 X |
| 3,316,801 | 5/1967 | Vogl | 350/81 X |
| 3,600,057 | 4/1969 | Leffler | 350/81 |

FOREIGN PATENTS OR APPLICATIONS

| | | | |
|---|---|---|---|
| 1,472,289 | 2/1969 | Germany | 350/81 |

*Primary Examiner*—David H. Rubin
*Attorney, Agent, or Firm*—Robert G. Slick

[57] ABSTRACT

A field marker for a microscope is provided which can be clipped onto the objective of an ordinary microscope. The field marker has a small rubber stamp thereon impregnated with a suitable dye or ink and when the technician wishes to mark any particular section on a slide or the like, it is only necessary to run the microscope down to make contact with the slide. A small mark is thus left on the slide at a point of interest so that the point can be rapidly relocated.

3 Claims, 7 Drawing Figures

PATENTED AUG 6 1974 3,827,777
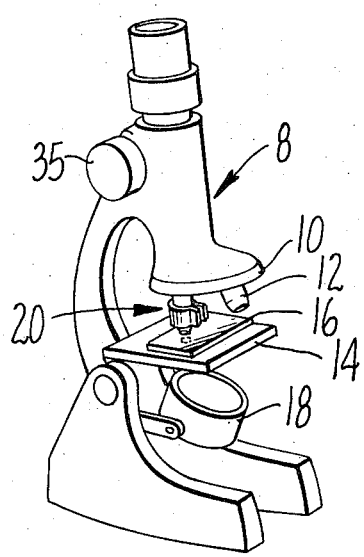
FIG. 1.
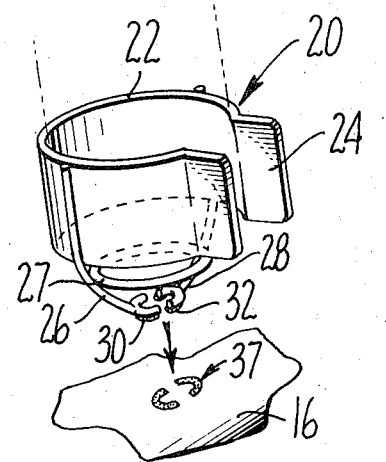
FIG. 2.
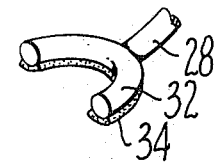
FIG. 3.
FIG. 4.
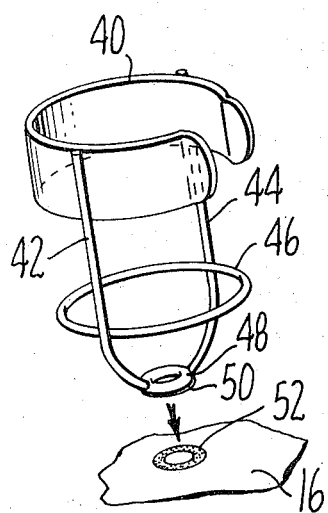
FIG. 6.
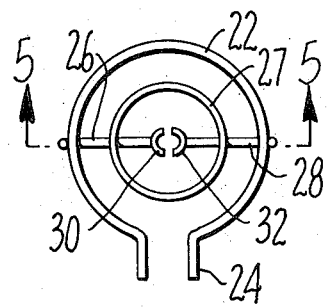
FIG. 5.
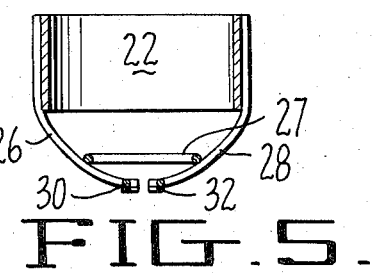
FIG. 7.
INVENTOR.
ETHELYN FORD
BY
ATTORNEYS

MICROSCOPE FIELD MARKER

This is a continuation, of U.S. Pat. application Ser. No. 172,064 filed Aug. 16, 1971, now abandoned.

SUMMARY OF THE INVENTION

In examining microscope slides, it is often desirable to provide some form of marking device so that some particular point of interest can be rapidly relocated. For instance, laboratory technicians often examine slides of smears or the like and if anything of a suspicious nature is found, the point on the slide is marked so that when the work is reviewed by a physician, any suspicious markings on the slide can be rapidly located, thus saving time of the person reviewing the slide.

Various markers have been proposed for slides in the past but none of these has been fully satisfactory. One type of marker consists of a device which screws into the noise piece of the microscope in place of one of the objectives. When a point of interest is found, the nose piece is rotated to bring the marker into position and the microscope to have been lowered until it touches the slide. This is inconvenient since the nose piece must be rotated for each marking and, if the indexing is not perfect, the marking may be slightly off from the desired position. Obviously such a device cannot be used with a microscope with a single objective and reduces the number of available objectives on the microscope with a rotating nosepiece.

Another type of finder is connected to the condenser of the microscope and marks the slide on the bottom. This ordinarily must be built as part of the microscope and is not particularly easy to use and does not always give an accurate location.

In accordance with the present invention, a snap-on marking device is provided which is inexpensive and which can be applied to the objective of any microscope. The device is snapped onto the objective and in use one peers through the marking device when looking at a slide. When a point of interest is found, it is only necessary to run the microscope down, using the usual focusing knob until the marker contacts the slide. There is no lost time in rotating the nosepiece nor is there any possibility of making an inaccurate marking since one can watch the slide almost to the point where the actual marking takes place.

The device of the present invention can be built in several forms and is a very inexpensive device. It is not necessary that the device be built into a microscope but it can be sold as an accessory and merely snapped in place without the use of tools and without detracting from the full utility of the microscope. It can be snapped in place without disturbing the setting of the microscope.

Various other features of the invention will be apparent from the description which follows.

BRIEF DESCRIPTION OF THE DRAWINGS

FIG. 1 is a perspective view of a microscope showing a device embodying the present invention in place.

FIG. 2 is an enlarged view of a marker embodying the present invention showing its method of use.

FIG. 3 is an enlarged protective view of one of the marking fingers.

FIG. 4 is a plan view of the device shown in FIG. 2.

FIG. 5 is a section on the line 5—5 of FIG. 4.

FIG. 6 is a perspective view of another device embodying the present invention.

FIG. 7 is a plan view of the device shown in FIG. 6.

DESCRIPTION OF THE PREFERRED EMBODIMENTS

Referring now to the drawings by reference characters, there is shown a microscope, generally designated 8, having a revolving nosepiece 10 carrying a plurality of objective lenses 12. A stage 14 is provided for holding a microscope slide 16 or other suitable specimen. The microscope includes the usual condenser lens 18 for illuminating the microscope.

Mounted on one of the objective lenses is a marker, generally designated 20, embodying the present invention. In this embodiment of the invention, the marker consists of a split ring 22 of spring metal and having finger holds 24 thereon which allow the ring to be easily snapped onto the end of a microscope objective. Attached to the ring 22 are two arms or supports 26 and 28, suitably of stiff wire to which are attached the marker elements 30 and 32. In this embodiment, the marker elements 30 and 32 form halves of a split circle, although it is apparent that a complete circle might be employed or that they might be in different configurations. Referring specifically to FIG. 3, the member 32 has a pad 34 at the bottom thereof which can be made of a spongy material which will hold ink or dye such as sponge rubber. The dye or ink selected will be naturally one which will give a good marking on the slide and the composition will depend to some extent on the material being examined on the slide. Suitable stains are available in various colors such as black, green and red. Suitably the stain is kept in stamp pads so that the rubber 34 is inked merely be pressing the stamp pad up against it. A reinforcing ring 27 may be employed to strengthen the structure. In use, the device is merely snapped onto the objective of the microscope as is shown in FIG. 1. The device does not interfere in any manner with the use of the microscope since the field in view is very small and the markers 30 and 32 are ordinarily well above the focal plane. When one sees an area of the slide which it is desired to mark, it is only necessary to run the tube down by the use of the focusing knob 35. As it shown in FIG. 2 marks 37 have been left on slide 16.

A slightly different version of the device is shown in FIGS. 6, and 7 but the operation is exactly the same. Here a spring ring 40 is provided with downwardly extending members or supports 42 and 44 which may be suitably provided with a reinforcing ring 46. The bottom ends of members 42 and 44 support a doughnut-shaped piece of metal or a continuous ring 48 having a sponge bottom 50 thereon. When it is desired to mark a slide 16, the device is merely lowered with the focusing knob as before, leaving a mark 52 on the slide 16.

Although certain specific embodiments of the invention have been shown, it will be understood that one can make wide departures from the exact structure shown without departing from the spirit of this invention.

I claim:

1. A self-aligning, readily attachable and removable, objective-carried field marker for a microscope for marking an area of interest on a slide, comprising:

a semicircular spring clip with opposite, spaced apart, adjacent ends, a substantially radially outwardly protruding finger grip means on each end of the spring clip to grasp the spring clip to readily position it on and remove it from an objective of a microscope, a pair of downwardly extending wire-like supports fixed at the upper ends thereof to said spring clip in circumferentially spaced relationship to one another and curving downwardly and inwardly from said spring clip and terminating at the lower ends thereof spaced closely adjacent the axis of the objective, an annular reinforcing ring secured to the supports between their upper and lower ends to reinforce the supports, an arcuate marker fixed to the lower end of each of the supports and supported thereby in a plane substantially perpendicular to the axis of the objective, said markers curving inwardly toward one another in at least partially surrounding relationship to the axis of the objective, and a spongy pad fixed to the underside of each of the markers to retain a suitable stain for application to the upper surface of a slide supported in the microscope to mark a desired point of interest on the slide, said markers movable toward and away from the slide with the objective on which the marker is supported so that the area of interest is marked by the simple expedient of moving the microscope objective toward the slide.

2. The field marker of claim 1, wherein the arcuate markers are joined to form a continuous ring.

3. The field marker of claim 1, wherein the ends of the arcuate markers are spaced to form a split ring.

* * * * *